United States Patent Office 2,898,142
Patented Aug. 4, 1959

2,898,142

DISC WHEELS

Heinrich Kordes, Osnabruck, Germany, assignor to Klockner - Georgsmarienwerke, Aktiengesellschaft, Osnabruck, Germany Application July 16, 1957, Serial No. 672,178

Claims priority, application Germany May 22, 1957

4 Claims. (Cl. 295—11)

The present invention relates to disc wheels more especially for use in railway rolling stock, of the type provided with resilient insertions stressed principally for compression, said insertions being interposed between two outer acute-angled surfaces of a wheel rim and the inner surfaces of a V-section annular flange connected with the wheel boss.

In the specification of my co-pending patent application No. 592,872, filed June 21, 1956, there is described one form of disc wheel of the type referred to in which the wheel rim is of V-section and the likewise V-section annular flange connected with the wheel boss comprises two similar, correspondingly angled sheet metal discs joined together by welded dowel pins and connected with the wheel boss welded seams, and that the insertions consist of a mouldable elastic synthetic plastic material.

The above described form of wheel provides a disc wheel of very light weight, especially inexpensive to manufacture and having optimum properties of resilience, in which the elasticity of the resilient insertions is put to practical use.

The present invention has for an object to provide an addition to, or modification of the invention claimed in my said co-pending patent application, thereby to make it possible to manufacture disc wheels of the type described in a particularly advantageous and economic manner, and according to the present invention the aforementioned annular flanges are provided with a female thread which engages a male tread on a web member of the wheel boss.

In a preferred embodiment of the present invention the requisite tight fit between the aforementioned threads is achieved by a shrinking operation which in its turn is advantageously assisted by under-cooling the wheel boss and if desired, slightly heating the annular flanges at the same time.

One form of disc wheel according to the invention will now be described with reference to the accompanying drawings, in which.

Figure 1:
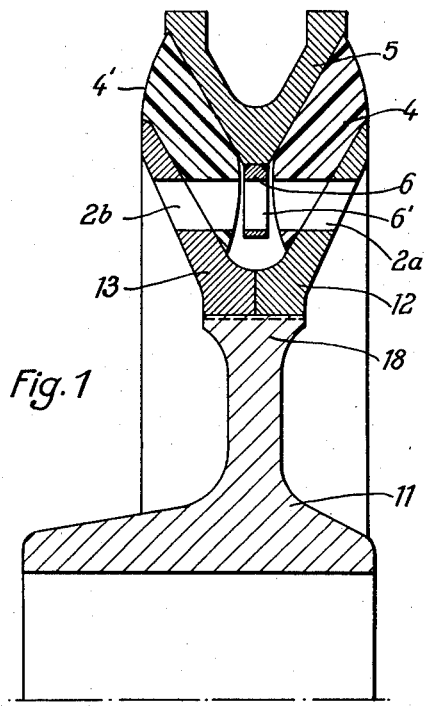
Figure 1 is a cross-section of a fully assembled wheel body omitting its associated tyre.

As will be seen from Figure 1, the wheel body according to the present invention comprises, as in the construction described in the specification of my said co-pending application, a wheel rim 5 for supporting the tyre (not shown) and which is made in one piece and is of V-shaped cross-section; along its inner periphery the wheel rim 5 has a number, for example, three, of equally spaced lugs 6. Each of the said lugs has a bore 6' extending therethrough with which are associated bores 2a and 2b respectively in the annular flanges 12, 13 associated with the boss 11, 18 of the wheel, and in the interposed resilient insertions 4, 4' (made of an elastic plastic) said bores, in the position of the components shown in Figure 1, being in line with the bore 6'. A screw bolt (not shown) inserted in the aforementioned bores provides a direct connection between the wheel rim 5 and the annular flanges 12, 13 in the manner of a bridge extending across the resilient insertions 4, 4'. This bridge has two purposes: on one hand, it facilitates the perfect machining of the wheel body components and more especially of the tyre after the insertions 4, 4' have been fitted; and on the other hand, it is possible with the aforementioned screw bolts to give the insertions a certain compressive pretension, though this desirable pretension can, of course, be produced equally well by means of other devices or arrangements.

Figure 3:
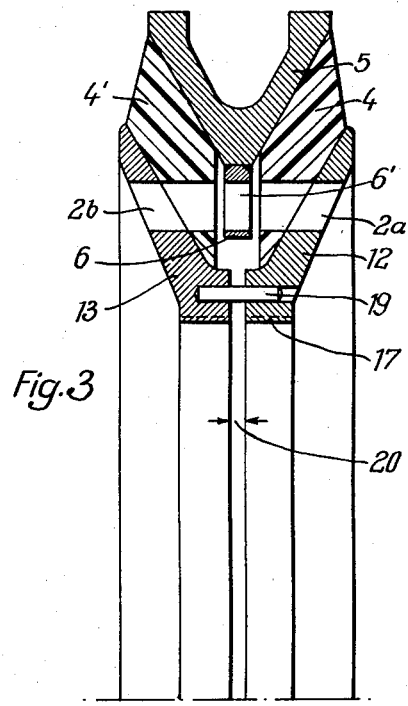
Figure 3 is a cross-section similar to Figure 1 showing the assembled wheel body before the interposed resilient insertions are given compressive pretension.
Figure 2:
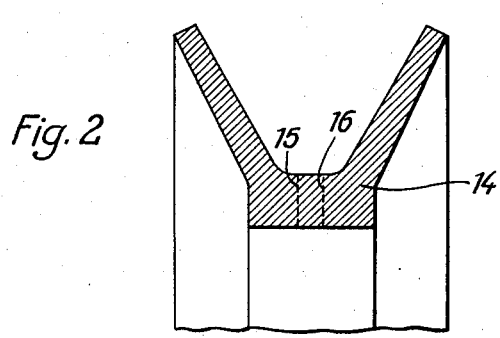
Figure 2 is a detail showing the blank from which the annular flanges of Figure 1 are formed and comprising a rolled section of substantially V-shaped cross-section.

However, whereas in the case of the construction of my said co-pending application, the wheel boss and the associated annular flanges are connected together by welding and by means of welded dowel pins, the annular flanges being, moreover, designed as suitably beaded rings of sheet metal, the present invention proposes to use a blank for making the annular flanges and comprising a rolled section 14 of V-shaped cross-section as shown in Figure 2. Advantageously, this rolled section is machined and then separated along the annuli 15, 16, into two congruent rings of annular flanges 12, 13 (Figures 1 and 3), and each of these rings is then provided on the inside, that is to say on the side facing the boss, with a female thread 17 (Figure 3). The web portion 18 of the boss 11 is provided with a mating male thread. Dowel pins 19 (Figure 3) ensure perfect centering and fixing of the two annular flanges 12, 13 during the machining as well as during the application of the compressive pretension to the resilient insertions 4, 4'.

What I claim is:

1. A disc wheel for use in railway rolling stock and the like, comprising a hub and web portion associated therewith, said web portion having a peripheral annular surface with a thread thereon, a pair of annular flanges which together form a V-shape in cross section and each having an internal thread meshing with the thread on the web portion, a pair of inclined inserts of resilient plastic material, and a V-shaped wheel rim in contact with the inserts and having internally extending lugs in spaced relation at the apex of the V-shaped rim, said flanges, inserts and the lug having concentric holes therein to receive bolts to secure the parts together.

2. A disc wheel according to claim 1, in which the flanges are provided with spaced dowel pins to center the annular flanges.

3. A disc wheel according to claim 1, in which the hub and web portion are integral with each other.

4. A disc wheel according to claim 1, in which the flanges are provided with spaced dowel pins to center the annular flanges and in which the hub and web portion are integral with each other.

References Cited in the file of this patent

UNITED STATES PATENTS

| | | |
|---|---|---|
| 1,076,591 | Lotte | Oct. 21, 1913 |
| 2,659,622 | Watter | Nov. 17, 1953 |
| 2,755,138 | Brink | July 17, 1956 |

FOREIGN PATENTS

| | | |
|---|---|---|
| 833,583 | France | July 25, 1938 |